United States Patent
Kobres et al.

(10) Patent No.: US 10,803,436 B2
(45) Date of Patent: Oct. 13, 2020

(54) METHODS AND A SYSTEM FOR CONTINUOUS AUTOMATED AUTHENTICATION

(71) Applicants: Erick Kobres, Lawrenceville, GA (US); Stavros Antonakakis, Lake Mary, FL (US); Ravi Prakash Mishra, Secunderabad (IN); Suman Kumar Bhowmick, Hyderabad (IN); Ajay Gordhandas Mulani, Sion (IN)

(72) Inventors: Erick Kobres, Lawrenceville, GA (US); Stavros Antonakakis, Lake Mary, FL (US); Ravi Prakash Mishra, Secunderabad (IN); Suman Kumar Bhowmick, Hyderabad (IN); Ajay Gordhandas Mulani, Sion (IN)

(73) Assignee: NCR Corporation, Atlanta, GA (US)

( * ) Notice: Subject to any disclaimer, the term of this patent is extended or adjusted under 35 U.S.C. 154(b) by 442 days.

(21) Appl. No.: 14/633,768

(22) Filed: Feb. 27, 2015

(65) Prior Publication Data
US 2016/0063503 A1    Mar. 3, 2016

Related U.S. Application Data

(60) Provisional application No. 62/043,025, filed on Aug. 28, 2014.

(51) Int. Cl.
*G06Q 20/20*    (2012.01)
*H04W 12/06*    (2009.01)
(Continued)

(52) U.S. Cl.
CPC ......... *G06Q 20/206* (2013.01); *G06F 21/316* (2013.01); *G06K 9/00288* (2013.01);
(Continued)

(58) Field of Classification Search
CPC .... G06Q 20/20; G06Q 20/206; G06Q 20/208; G06Q 20/40; G06Q 20/401;
(Continued)

(56) References Cited

U.S. PATENT DOCUMENTS 7,526,412 B2 * 4/2009 Mani .................... G06F 21/32
                                                                702/194
9,319,221 B1 * 4/2016 Awad ................... H04L 9/3231
(Continued)

OTHER PUBLICATIONS

Kalamandeen, Andre, et al. "Ensemble: cooperative proximity-based authentication." Proceedings of the 8th international conference on Mobile systems, applications, and services. 2010.*

*Primary Examiner* — Asfand M Sheikh
(74) *Attorney, Agent, or Firm* — Schwegman, Lundberg & Woessner (57) ABSTRACT

Sensors provide sensor data continuously from a device. The sensor data is continuously processed as factors to generate a confidence value for authentication. The confidence value is compared to a predetermined threshold value or predetermined range of values to determine whether a user is to be authenticated for access to one or more of: a device, a resource, and a transaction operation for a transaction.

19 Claims, 5 Drawing Sheets

(51) Int. Cl.
*G06Q 20/40* (2012.01)
*H04W 12/00* (2009.01)
*G06F 21/31* (2013.01)
*H04L 29/06* (2006.01)
*G06K 9/00* (2006.01)
*G10L 17/00* (2013.01)
*H04L 29/08* (2006.01)

(52) U.S. Cl.
CPC ........... *G06Q 20/20* (2013.01); *G06Q 20/208* (2013.01); *G06Q 20/40* (2013.01); *G06Q 20/401* (2013.01); *G06Q 20/4016* (2013.01); *G06Q 20/40145* (2013.01); *G10L 17/005* (2013.01); *H04L 63/08* (2013.01); *H04L 63/0853* (2013.01); *H04L 63/102* (2013.01); *H04W 12/003* (2019.01); *H04W 12/06* (2013.01); *G06F 2221/2111* (2013.01); *H04L 67/12* (2013.01)

(58) Field of Classification Search
CPC .......... G06Q 20/40145; G06Q 20/4016; G06F 21/316; G06F 2221/2111; H04W 12/003; H04W 12/06; G06K 9/00288; G10L 17/005; H04L 63/08; H04L 63/0853; H04L 63/102; H04L 67/12
See application file for complete search history.

(56) References Cited

U.S. PATENT DOCUMENTS

| | | | |
|---|---|---|---|
| 9,715,684 B2* | 7/2017 | Kobres | G06Q 20/208 |
| 9,754,093 B2* | 9/2017 | Kobres | H04L 63/0853 |
| 10,217,103 B2* | 2/2019 | Soundararajan | G06Q 20/322 |
| 10,354,054 B2* | 7/2019 | Kobres | H04L 63/0853 |
| 10,460,090 B2* | 10/2019 | Kobres | H04L 63/0853 |
| 10,546,439 B2* | 1/2020 | Williams | G04G 21/00 |
| 2007/0240230 A1* | 10/2007 | O'Connell | G06F 21/55 726/28 |
| 2009/0063312 A1* | 3/2009 | Hurst | G06Q 20/105 705/30 |
| 2011/0314530 A1* | 12/2011 | Donaldson | G06F 21/83 726/7 |
| 2013/0133055 A1* | 5/2013 | Ali | H04L 63/107 726/7 |
| 2014/0118520 A1* | 5/2014 | Slaby | G06K 9/00926 348/77 |
| 2014/0366111 A1* | 12/2014 | Sheller | H04L 63/08 726/7 |
| 2015/0035643 A1* | 2/2015 | Kursun | G07C 9/37 340/5.52 |
| 2015/0213245 A1* | 7/2015 | Tartz | G06F 21/83 726/17 |
| 2015/0242605 A1* | 8/2015 | Du | H04W 12/0605 726/7 |
| 2016/0055485 A1* | 2/2016 | Benoit | H04W 12/04 705/71 |

* cited by examiner

FIG. 5

METHODS AND A SYSTEM FOR CONTINUOUS AUTOMATED AUTHENTICATION

RELATED APPLICATIONS

The present application is co-pending with, claims priority to, and is a non-provisional filing of Provisional Patent Application Ser. No. 62/043,025 entitled: "Passive Authentication and Authentication Confidence Calculator," filed on Aug. 28, 2014, the disclosure of which is incorporated in its entirety herein and below.

BACKGROUND

Electronic authentication is commonplace in today's highly-connected society, especially in view of the fact that more and more individuals are conducting financial and personal transaction electronically.

Authentication can come in a variety of forms, such as single-factor authentication and multifactor authentication. Authentication can be done with different degrees of perceived strength. For example, biometric authentication is typically believed to be a stronger form of authentication than an identifier and password combination.

Some authentication requires a user to possess something (such as a token or a magnetic card) and to know something (such as a password or key value). Generally, authentication requires some action on the part of the individual being authenticated, such as having finger scanned, entering a card and Personal Identification Number (PIN), providing a token or certificate with a key, and the like.

Most authentication techniques are binary in nature, which means the authentication technique authenticates an entity or fails to authenticate the entity. Authentication is typically associated with individuals being authenticated but in fact, hardware resources and software resources are also subject to authentication in computer systems.

However, if authentication is wanted not for necessarily performing a secure transaction, accessing a secure system, or verifying a secure asset but, rather authentication is wanted for deciding whether there is a measurable degree of confidence that someone can be identified without any affirmative knowledge or action on the part of that someone, then very little exists in the industry for this type of authentication. But, such a technique can provide a variety of beneficial opportunities for enterprises for purposes of: marketing, customer service, Customer Relationship Management (CRM), security within an enterprise, security of an individual's personal device, security within law and government agencies, and the like.

Therefore, there is a need for improved authentication mechanisms.

SUMMARY

In various embodiments, methods and a system for continuous automated authentication confidence are presented.

According to an embodiment, a method for continuous automated authentication is presented. Specifically, sensor data is obtained from a sensor interfaced to a device. Next, a confidence value is generated from the sensor data. Finally, the confidence value is provided for passively authenticating a resource for access to one or more of: the device, a second resource, and a transaction operation.

DETAILED DESCRIPTION

Figure 1:
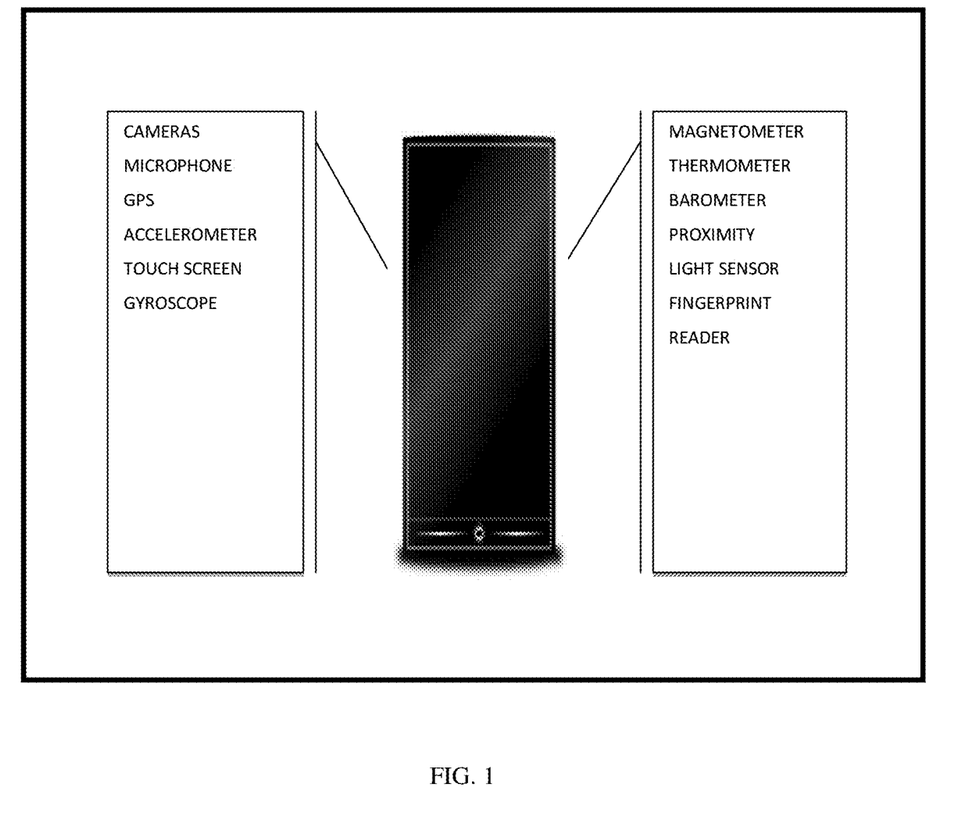
FIG. 1 is a diagram illustrating sensors of a mobile device capable of performing continuous automated authentication, according to an example embodiment.

FIG. 1 is a diagram illustrating sensors of a mobile device capable of performing continuous automated authentication, according to an example embodiment. It is to be noted that the components are shown schematically in greatly simplified form, with only those components relevant to understanding of the embodiments being illustrated.

As used herein term "confidence" and the phrase "confidence value" may be used interchangeably and synonymously. The term and phrase refer to a computed scalar value provided through the various mechanisms and inputs to those mechanisms discussed herein and below. The scalar value is relevant to determining whether a user and/or a device associated with that user is to be authenticated. That is, the scalar value when compared to a predetermined value may provide authentication of a user and/or of a device.

The authentication performed is "passive," which means that the user does not have to affirmatively provide (through a manual input mechanism) any credential to achieve authentication; rather, the confidence associated with ongoing and continuous authentication of the user and/or device occurs through regularly computing, in an unobtrusive and transparent manner from the perspective of the user, the authentication confidence (scalar value), which is then compared with a predetermined value to determine whether authentication was achievable or not achievable.

It is noted that based on the comparison between any computed confidence and any predetermined value; authentication does not have to be a binary exercise. That is, a user may be granted different levels of access (to resources of a device) based on a computed difference between the confidence value (at any given point in time) and a predetermined value. For example, when the different between the computed confidence and a predetermined value is within a predefined range, then the user is granted access to limited resources and not all available resources on a device. This is but one example; the point is that confidence with respect to user/device authentication can result in: a failed authentication having no access to any resources, a successful authentication having access to all resources, or a limited authentication having varying levels of access to some resources.

A "confidence calculator" is one or more software modules implemented as executable instructions within a memory of a device and/or on a non-transitory computer-readable storage medium of the device. The executable instructions execute on one or more processors of the device.

The confidence calculator can be executed in multiple different processing environments and on multiple different devices as a particular "instance" of the confidence calculator. Multiple instances of the confidence calculator may cooperate with one another to produce a single confidence value. In some cases, multiple instances of the confidence calculator may be chained together, such that output from one instance becomes one input value to a next instance in the chain of confidence calculators.

As used herein the "confidence calculator" was described and incorporated by reference herein in its entirety from Provisional Patent Application Ser. No. 62/043,025 entitled: "Passive Authentication and Authentication Confidence Calculator," filed on Aug. 28, 2014.

FIG. 1 illustrates various types of sensors that a mobile device is equipped with. These sensors can continuously gather data from the mobile device's environment and provided as input to one or more confidence calculators for purposes of passively authenticating an operator (user) of the mobile device.

Some example sensors of a mobile device are provided in the FIG. 1; the sensors include: cameras (front and rear facing), a microphone, a Global Positioning Satellite (GPS) receiver, an accelerometer, a touch screen (a type of Human Input Device (HID) for the mobile device), a gyroscope, a magnetometer, a thermometer, a barometer, a proximity sensor, a fingerprint scanner, a card reader, and others.

The mobile device can be: a mobile phone, a wearable processing device (watch, jewelry, pendant, glasses, etc.), a laptop, a tablet, and the like.

In fact, modern mobile and wearable devices are equipped with an ever increasing number of sensors empowering it to better recognize and interact with its surroundings. The sensors collect data from the environment and processing associated with the sensors are enhanced herein to pre-process the data and send the pre-processed data as inputs into confidence calculators where the pre-processed data is used in conjunction with, perhaps, other inputs for to produce confidence scalar values for passive authentication determinations. This continuous stream of sensor data into confidence calculators then produces a continuous overall confidence value at any point in time, which provides the device with a level of certainty that the expected owner/operator of the device is currently in its possession.

The passive authentication processing is achieved by a continuous, automated, a non-intrusive, and multi-sensory input approach, which allows the device to have, at any time, a level of confidence that the owner is currently in possession of the device. Moreover, the device, operating system (OS), and other device security applications do not need to prompt the operator for login credentials, fingerprint scans, or other intrusive manual authentication mechanisms unless the confidence value is too low when compared to threshold values or predetermined ranges of values.

It is noted that the sensors depicted for the example device in the FIG. 1 is not an exhaustive list and is not intended to be all-inclusive. Moreover, it is noted that combinations of sensor data from multiple sensors can be fed to an instance of a confidence calculator simultaneously for a single resolution (at a given point in time) of a confidence scalar value for comparison against a threshold or a predefined range to make an automated passive authentication determination.

Some of the sensors and their collected data along with how that data, in example embodiments, can be processed to make automated continuous passive authentication determinations are now described with reference to the FIG. 1.

GPS: The mobile device uses GPS data to track a user's location. The sensor data is sent to confidence calculator that is responsible for: recording the location along with a time stamp, building a history of user movement over time, etc. As data is accumulated, a multi-dimensional frequency graph that includes GPS positions and time stamps is built that can be used to correlate a current user location at a specific time against that user's historical data. The confidence calculator also calculates a confidence scalar value based on whether the user is traveling to expected or unexpected locations at an expected time.

Accelerometer & gyroscope for gait: The mobile device uses its accelerometer and gyroscope to construct a model of the user's motion while walking or running (gait), exercising, sitting, standing, or other everyday movement. These sensors can also detect when the mobile device is physically on the person and when it's not. The accelerometer samples acceleration forces which when coupled with a gyroscope's orientation sensors allows for the modeling of fairly detailed motion, which the confidence calculators can then map to known and learned movement types. As the confidence calculators assist in building a history of this data, a confidence scalar value based on the expected behavior of the user can be resolved at any given point in time. In an embodiment, training processing is used by having the user manually tag start/end times for specific events. For example, before a run, the user might let the mobile device know he is about to run and then mark the end of the run once the exercise stops. Similar user hints can be dropped for other types of activities such as walking, speed-walking, various sports, etc.

Accelerometer & gyroscope for arm motion: The mobile device uses its accelerometer and gyroscope to construct a model of the motion path a user takes to bring the device to their ear(for a call) or in front of them (for reading or use of speaker phone) and the angle at which it is held while in use. The OS of the mobile device can provide hints of these activities starting/ending, such as when there's an incoming call or text, or when the user is actively reading/typing and then feeding those hints along with the sensor data, models of the movement are saved over time, which are then used for correlating a current motion to generate a confidence match.

The touch screen: The processing of the mobile device analyzes the characteristics of the user's use of the touch screen including pressure applied and finger movement (speed, acceleration, etc.) to continuously authenticate the user. The confidence calculator stores this tactile information to refine the models for continuous detection improvements over time as current activity is correlated against historical data.

The front-facing camera: The mobile device uses the front facing camera to detect a person's face is in view, and will take a picture. Using the front-facing camera greatly increases the frequency of opportunities since the user will usually be in view when using his phone. Pictures (images) that are captured are stored in a database and facial recognition analysis is run against a set of known quantities to supply the confidence scalar value. In an embodiment, a setup period is used in which a number of head shots are taken of the owner of the phone under different lighting conditions to establish a baseline for comparison. In an embodiment, in order to mitigate concerns against privacy, the techniques can ensure any such facial recognition approach is clearly explained to the user along with an explicit opt-in action required by the owner of the mobile device and also performing the image processing on the device can appease some consumers. In an embodiment, server-based processing for the facial recognition is used to take advantage of more secure and more powerful processing systems.

The Microphone: The mobile device listens for the ambient sound of the user's voice using traditional voice tone pattern recognition tactics as an additional confidence factor. The data is fed into a confidence calculator where services can be used to extract key metadata and store it over time. On device and off-device noise reduction and primary audio enhancement digital signal processing algorithms are used to refine the sound and reduce error rates. In an embodiment, a setup or learning period takes place where the processing asks the operator to read passages aloud to record a baseline of the expected voice; however, it is to be noted that this is not a requirement.

Again, it is also noted that multiple sensor data from multiple sensors can be fed to one or more confidence calculators at any given point in time. Each of the scalar values produced by the confidence calculators can be weighted and combined to form a single-point-in-time scalar value, which is then compared against a threshold value or predefined ranges of values to make an automated determination as to whether authentication was achieved of the mobile device operator. The authentication can be binary or can be based on levels of authentication (such as security roles) where depending upon the security role access to some operations may be limited or restricted from the mobile device while other operations are permitted.

Figure 2:
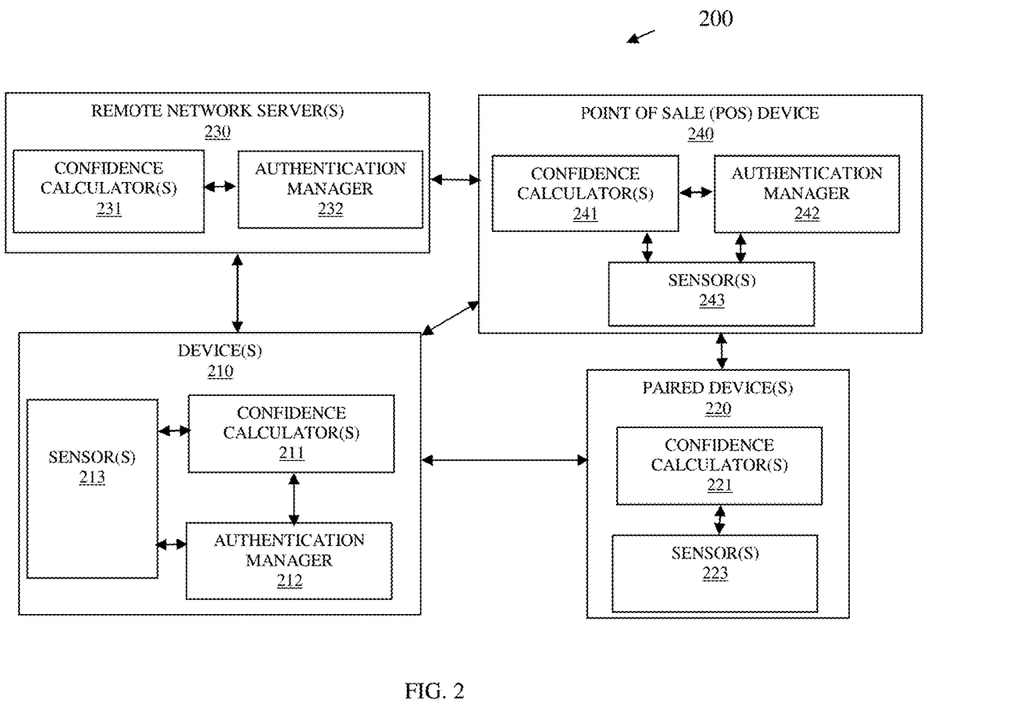
FIG. 2 is a diagram illustrating a system for continuous automated authentication, according to an example embodiment.

FIG. 2 is a diagram illustrating a system 200 for continuous automated authentication, according to an example embodiment.

The system 200 includes a variety of modules that can be optionally configured in a variety of arrangements. For example, the device 210 may include just sensors 213 and an authentication manager 212, which communicates with other external confidence calculators (221, 231, and/or 241) and other external authentication managers (222 and/or 242). So, although the system 200 is described as each device (210, 220, 230, and 240) as having a variety of components, it is to be understood that other arrangements are foreseeable without departing from the beneficial teachings of continuous automated authentication presented herein.

The system 200 includes a device 210 having a confidence calculator 211, an authentication manager 212, and one or more sensors 213 (hereinafter sensors 213). Optionally, the system 200 includes a paired/interfaced device 220 having a confidence calculator 221 and sensors 223. The system 200 may also include a remote network server 230 having a confidence calculator 231 and an authentication manager 232. Still further the system 200 includes a POS terminal/device 240 having a confidence calculator 241, an authentication manager 242, and sensors 243.

In an embodiment, the device 210 is mobile phone.
In an embodiment, the device 210 is a tablet.
In an embodiment, the device 210 is a laptop.
In an embodiment, the device 210 is an appliance.
In an embodiment, the device 210 is a desktop computer.
In an embodiment, the device 210 is a wearable processing device.
In an embodiment, the device 210 is a vehicle.

The device 210 includes one or more processors, memory, and non-transitory computer-readable storage media. The device 210 is operated by a user and includes a variety of software, hardware, and data assets (resources), and, perhaps, integrated peripheral devices.

The confidence calculator 211 is implemented as one or more software modules as executable instructions that are programmed in the firmware, dedicated secure processor, general purpose memory and/or non-transitory computer-readable storage media of the device 210. The device's processors are configured to execute the confidence calculator 211. In an embodiment, the confidence calculator 211 is initiated and loaded for processing within the device 210 when the device 210 is booted or powered on.

The confidence calculator 211 is configured to execute in a transparent and unobtrusive manner so that the user can continue to operate the device without an indication of the processing being performed by the confidence calculator 211.

The frequency with which the confidence calculator 211 performs iterations to gather input streams and produce a confidence value is configurable. However, when an event is detected requiring authentication of the user, such as when: the user unlocks a screen rendered on a display of the device 210, powers the device 210 on, attempts to access a specific resource requiring additional authentication, and the like, the confidence calculator 211 provides access to continuously computed single scalar confidence values over time generated through confidence calculators 211, 221, 231, and/or 241, which input from the streams of data provided by the sensors 213 and/or external sensors 223 and/or 243.

The processing associated with the confidence calculators 211, 221, 231, and 241 were discussed in the provisional filing that was incorporated by reference herein in its entirety.

The input streams of data that the confidence calculator 211 processes are provided by the sensors 213. Some example sensors 213 were discussed above with reference to the FIG. 1.

The output of the confidence calculator 211 is a scalar confidence value that can be used alone or in combination with other scalar confidence values to make an automated passive authentication determination for an operator of the device 210 at a given point in time. This is done through the authentication manager 212. In an embodiment, the automated passive authentication determination is outsourced by the authentication manager 212 to either the authentication manager 232 or the authentication manager 242.

It is noted that the authentication manager 212 may send the request that triggers the confidence calculator 211 to provide the currently calculated confidence value as well.

The authentication manager 212 is preconfigured with authentication values, ranges of values, thresholds, and/or policy conditions that when compared against the single confidence value makes a decision as to whether to authenticate the user for access to the device 210 or as to whether to authenticate the user for access to a specific resource or specific set of resources accessible from the device 210.

In an embodiment, the processing of the confidence calculator 211 requests and uses confidence values supplied by one or more of: a confidence calculator 221 of a paired/connected device 220, a confidence calculator 231 of a remote network server 230, and/or a confidence calculator 242 of a POS device 240 that the device 210 is interacting with to complete a transaction.

The paired device 200 may include its own confidence calculator 221 and its own sensors 223. The paired device 200 may interact and be paired with the device 210 and/or the POS device 240. The confidence calculator 221 receives input from its sensors 223 and produces a single confidence scalar value at a given point in time. This confidence value can be supplied to the authentication manager 212 of the device 210 and/or to the authentication manager 242 of the POS device 240.

In an embodiment, the paired device 200 is a pair of processor-enabled glasses.

In an embodiment, the paired device 200 is a processor-enabled watch.

In an embodiment, the paired device 200 is a processor-enabled health-related band or pendant.

The remote network server 230 may be used to collect sensor data from the device 210, the paired device 220, and/or POS device 240 to produce a confidence value and make an automated passive authentication determination through the authentication manager 232, which is communicated to the authentication manager 212 and/or the authentication manager 243.

In an embodiment, the confidence calculator 231 collects component confidence values, at any point in time, from the confidence calculators 211, 221, and/or 242, perhaps weights these confidence values and produces a single confidence value that is fed to the authentication manager 232 for an automated passive authentication determination at a particular point in time.

The POS device 240 may include its own sensors 243 to capture aspects associated with the operator of the device 210 and may include its own confidence calculator 241 and authentication manager 242. The confidence calculator may be interfaced with the other confidence calculators 211, 221, and/or 231 and the authentication manager 242 may be interfaced with one or more of the other authentication managers 212 and/or 232.

In an embodiment, the POS device 240 is a Self-Service Terminal (SST).

In an embodiment, the POS device 240 is a cashier-assisted checkout terminal.

In an embodiment, the POS device 240 is an Automated Teller Machine (ATM).

In an embodiment, the POS device 240 is a kiosk.

During operation, the system 200 obtains sensor data from sensors 213, 223, and/or 243. The sensor data is then fed to one or more confidence calculators 211, 221, 231, and 241 to produce a single scalar confidence value. The confidence value is then fed to one or more of the authentication managers 212, 232, and 242 to determine at a given point in time whether an operator or user of device 210 is authenticated for either access to the device 210 or to an operation provided by the POS device 240 (such as payment for a transaction). It is noted that in some cases a lack of authentication may be an indication of fraud. For example, the operator of the device 210 is not the true operator and is attempting to use a payment mechanism provided by the device 210 to complete a transaction with the POS device 240.

A variety of novel passive authentication scenarios that are processed by the system 200 are now presented.

Consider a retailer that maintains shopping patterns for its users on the remote network server 230. Generally, users are creatures of habit and purchase the same or similar items over and over again without much deviation and any deviations occur because of some knowable/explainable event, such as life-event (promotion, death, wedding, birth of child, etc.) or other event (weather, sporting, catastrophe, political, etc.). Based on this, the retailer can provide a shopping pattern with rules related to when deviations from the pattern are acceptable or explainable and embody and represent the pattern and rules for deviations in electronic formats on the remote network server 230. The pattern may include other attributes as well such as quantity of specific items, frequency of purchases for a given item (e.g., milk, beer, etc.), time of day purchases most frequently made, day of week purchases most frequently made, locations purchases most frequently made, etc.

When a user purchases items at the POS device 240, the scanner (type of sensor 243) collects the items purchased for the transaction, time of day, day of week, location of purchase (based on an identifier for the POS device 240), and the like. The user may be identified through device 210 or some other mechanism such as through a HID of the POS device 240 (where the user enters a credit card, loyalty card/number, phone number, etc.). The collected sensor data for the transaction can be fed to the confidence calculator 241 or to 231 where based on a shopping pattern for the user produces a single confidence value that is then compared against a threshold or predefined range of values by the authentication manager 242 or authentication manager 232 and the user can be automatically and passively authenticated to proceed with the transaction and perhaps use a credit card on file to pay for the transaction or have a check cashed. Alternatively, the single confidence value may indicate that the operator of the device 210 is potentially an imposter, in which case a clerk can request photo identification before the transaction can proceed and when the POS terminal 240 is a SST an alert can be raised to dispatch a clerk to the SST to acquire the photo identification from the user of the device 210.

As another somewhat related scenario, the users brand loyalty can be used as a factor for the passive authentication determination. That is, when a user has a known strong brand loyalty for a certain type of good at a retail establishment (e.g., paper towels, etc.), then this brand loyalty can be used as a factor with the shopping pattern or by itself to feed the automated passive authentication for a transaction at a POS device 240 in manners to similar with what was discussed above with the shopping pattern scenario. In an embodiment, the brands typically bought by a user are part of the shopping pattern discussed above. In an embodiment, the brands typically bought by a user are the shopping patterns discussed above.

In a scenario, users can be authenticated based on the company they typically keep. That is, a mother may always be with a teenage daughter when at a store or a husband and wife may always eat together at a restaurant. Generally, individuals go to retail establishments with a same set of other individuals. Here, the POS terminal 240 may receive a contact or buddy list either from the server 230 or directly from a user's device 210 in real-time when the user is out that POS terminal 240 conducting a transaction. The POS terminal 240 or server 230 then conducts a scan or search in the vicinity for a member of the buddy list and uses this as a factor for the passive authentication of the user during the transaction at the POS terminal 240. In some cases, the buddy may receive a pop-up notice on the buddy's device to confirm that they are with the user. In other cases, the mere presence of the buddy device for the buddy is used as a factor for the passive authentication. The factor is input provided to the confidence calculators 211, 221, 231, and/or 241.

In another example scenario, the path or route that an individual takes to reach a store or a POS terminal 240 is used as a factor for passive authentication provided to the confidence calculators 211, 221, 231, and/or 241. This can include as factors, the route, the mode of transportation (walking, driving, etc.), or a combination of the route and mode (e.g., walk from office to store but drive from home to store, etc.). The time and time of day associated with the route traveled and the mode can be used as a factor as well. These factors provided by sensors 213 and/or 223 and used by confidence calculators 211, 221, 231, and/or 241 to produce a single confidence value for passive authentication during a transaction at the POS terminal 240, and the passive authentication determined by the authentication manager 242 and/or 232.

A variety of other scenarios may be processed as well by the system 200 to perform continuous automated passive authentication of a user and/or the user's device 210. This provides convenience to the user, improves transaction throughput and security at the POS terminal 240 and assist in the prevention of device 210 thefts and/or fraud at the POS terminal 240.

Some of embodiments of the FIG. 1 and the FIG. 2 and other embodiments are now discussed with reference to the FIGS. 3-5.

Figure 3:
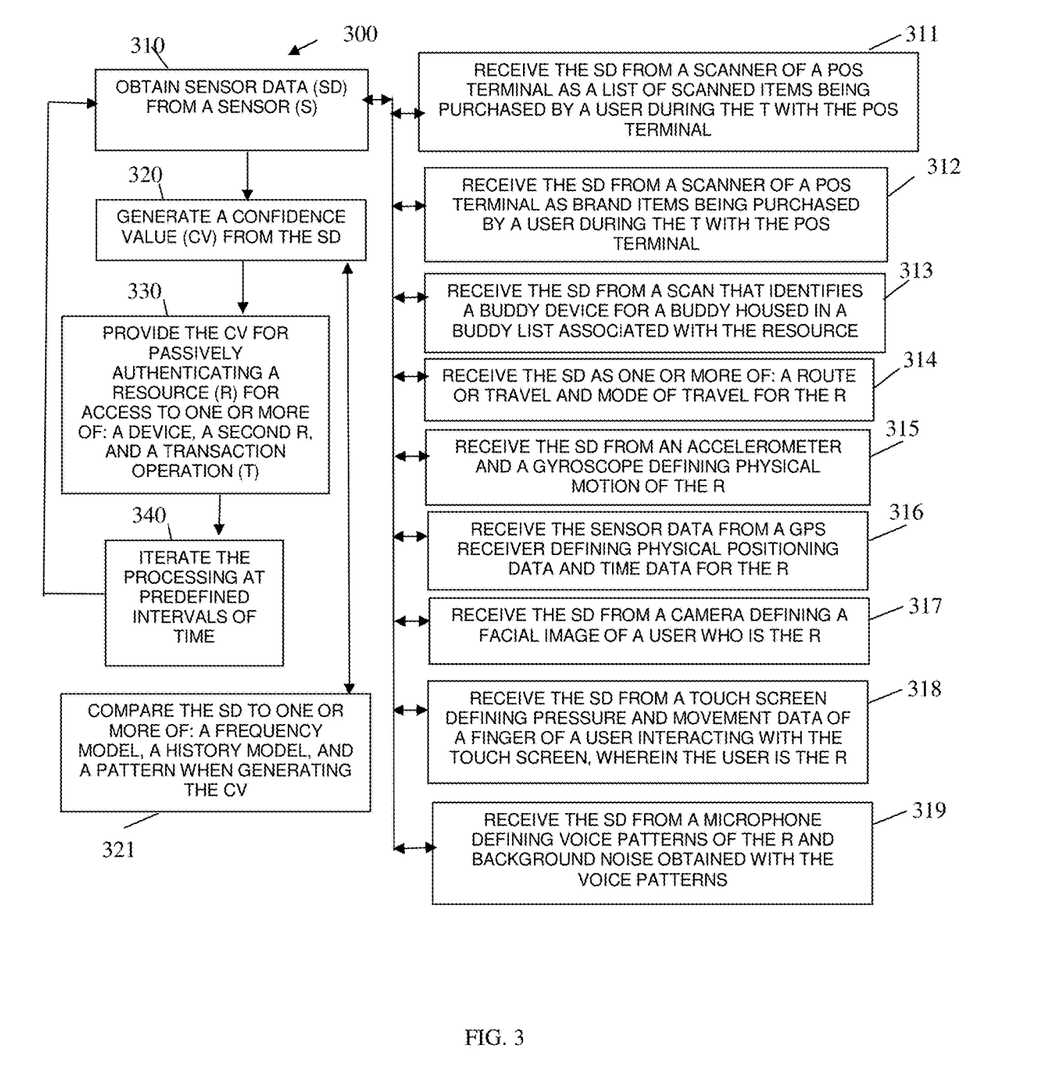
FIG. 3 is a diagram of a method for continuous automated authentication, according to an example embodiment.

FIG. 3 is a diagram of a method 300 for continuous automated authentication, according to an example embodiment. The software module(s) that implements the method 300 is referred to as a "continuous authenticator." The continuous authenticator is implemented as executable instructions programmed and residing within secure memory and/or a non-transitory computer-readable (processor-readable) storage medium and executed by one or more processors of a device. The processor(s) of the device that executes the continuous authenticator are specifically configured and programmed to process the continuous authenticator. The continuous authenticator has access to one or more network connections during its processing. The network connections can be wired, wireless, or a combination of wired and wireless.

In an embodiment, the device that executes the continuous authenticator is a POS terminal.

In an embodiment, the device that executes continuous authenticator is a Self-Service Terminal (SST).

In an embodiment, the device that executes the continuous authenticator is a kiosk.

In an embodiment, the device that executes the continuous authenticator is an Automated Teller Machine (ATM).

In an embodiment, the device that executes the continuous authenticator is a cashier-assisted terminal.

In an embodiment, the device that executes the continuous authenticator is a mobile phone.

In an embodiment, the device that executes the continuous authenticator is a tablet.

In an embodiment, the device that executes the continuous authenticator is wearable processing device.

In an embodiment, the device that executes the continuous authenticator is a vehicle.

In an embodiment, the device that executes the continuous authenticator is a laptop.

In an embodiment, the device that executes the continuous authenticator is a desktop computer.

In an embodiment, the device that executes the continuous authenticator is an appliance.

In an embodiment, the continuous authenticator is an instance of a confidence calculator described in the FIGS. 1 and 2.

In an embodiment, the continuous authenticator is the confidence calculator 211 of the FIG. 2.

In an embodiment, the continuous authenticator is the confidence calculator 221 of the FIG. 2.

In an embodiment, the continuous authenticator is the confidence calculator 231 of the FIG. 2.

In an embodiment, the continuous authenticator is the confidence calculator 241 of the FIG. 2.

At 310, the continuous authenticator obtains sensor data from a sensor. The sensor can be associated with the device that executes the continuous authenticator. Alternatively, the sensor can be associated with a different device from the device that executes the continuous authenticator.

A "resource" as used herein can be a user, a software module, and/or a hardware module/device.

According to an embodiment, at 311, the continuous authenticator receives the sensor data from a scanner of a POS terminal as a list of scanned items being purchased by a user during the transaction operation with the POS terminal. Here, the resource is the user.

In an embodiment, at 312, the continuous authenticator receives the sensor data from a scanner of a POS terminal as brand items being purchased by the user during the transaction operation with the POS terminal. Again, in this embodiment, the user is the resource.

In an embodiment, at 313, the continuous authenticator receives the sensor data from a scan that identifies a buddy device for a buddy housed in a buddy list associated with the resource. This was discussed above with reference to the FIGS. 1 and 2.

In an embodiment, at 314, the continuous authenticator receives the sensor data as one or more of: a route of travel and a mode of travel for the resource.

In an embodiment, at 315, the continuous authenticator receives the sensor data from an accelerometer and a gyroscope defining physical motion of the resource.

In an embodiment, at 316, the continuous authenticator receives the sensor data from a GPS receiver defining physical positioning data and time data for the resource.

In an embodiment, at 317, the continuous authenticator receives the sensor data from a camera defining a facial image of a user who is the resource.

In an embodiment, at 318, the continuous authenticator receives the sensor data from a touch screen defining pressure and movement data of a finger of a user interacting with the touch screen. Here, the user is the resource.

In an embodiment, at 319, the continuous authenticator receives the sensor data from a microphone defining voice patterns of the resource and background noise obtained with the voice patterns.

At 320, the continuous authenticator generates a confidence value from the sensor data. That is, the sensor data is provided as one or more factors to a confidence calculator as discussed above with reference to the FIGS. 1 and 2.

According to an embodiment, at 321, the continuous authenticator compares the sensor data to one or more of: a frequency model, a history model, and a pattern when generating the confidence value. This was discussed above with reference to the FIGS. 1 and 2.

At 330, the continuous authenticator provides the confidence value for passively authenticating a resource for access to one or more of: a device, a second resource, and a transaction operation.

In an embodiment, at 340, the continuous authenticator continuously iterates the processing of 310-330 at predefined intervals of time.

Figure 4:
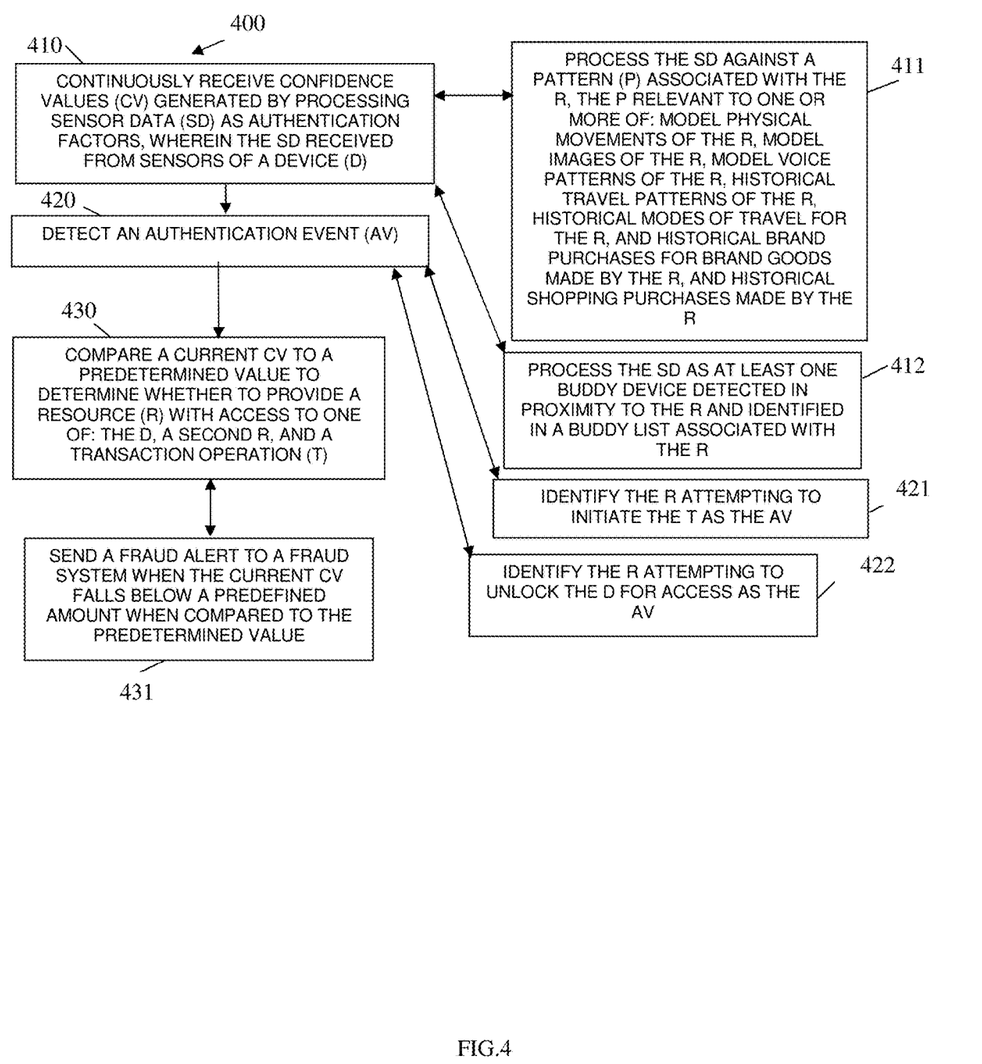
FIG. 4 is a diagram of another method for continuous automated authentication, according to an example embodiment.

FIG. 4 is a diagram of another method 400 for continuous automated authentication, according to an example embodiment. The software module(s) that implements the method 400 is referred to as a "continuous authentication manager." The continuous authentication manager is implemented as executable instructions programmed and residing within secure memory and/or a non-transitory computer-readable (processor-readable) storage medium and executed by one or more processors of a device. The processors that execute the continuous authentication manager are specifically configured and programmed to process the continuous authentication manager. The continuous authentication manager has access to one or more network connections during its processing. The network connections can be wired, wireless, or a combination of wired and wireless.

In an embodiment, the device that executes the continuous authentication manager is different from a second device that the continuous authentication manager is providing authentication for. In an embodiment, the device is within a local networked environment of the second device. In an embodiment, the device is remotely located over a Wide-Area Network (WAN) from the device.

In an embodiment, the device that executes the continuous authentication manager is a POS terminal.

In an embodiment, the device that executes continuous authentication manager is a Self-Service Terminal (SST).

In an embodiment, the device that executes the continuous authentication manager is a kiosk.

In an embodiment, the device that executes the continuous authentication manager is an Automated Teller Machine (ATM).

In an embodiment, the device that executes the continuous authentication manager is a cashier-assisted terminal.

In an embodiment, the device that executes the continuous authentication manager is a mobile phone.

In an embodiment, the device that executes the continuous authentication manager is a tablet.

In an embodiment, the device that executes the continuous authentication manager is wearable processing device.

In an embodiment, the device that executes the continuous authentication manager is a vehicle.

In an embodiment, the device that executes the continuous authentication manager is a laptop.

In an embodiment, the device that executes the continuous authentication manager is a desktop computer.

In an embodiment, the device that executes the continuous authentication manager is an appliance.

In an embodiment, the continuous authentication manager is the authentication manager 212 of the FIG. 2.

In an embodiment, the continuous authentication manager is the authentication manager 232 of the FIG. 2.

In an embodiment, the continuous authentication manager is the authentication manager 242 of the FIG. 2.

The continuous authentication manager takes as input a confidence value supplied by a confidence calculator and makes authentication decisions with respect to users, devices, and/or resources of those devices. The confidence calculator is an instance of one or more of: the confidence calculators discussed above with reference to the FIGS. 1-3 (method 300).

At 410, the continuous authentication manager continuously receives confidence values generated by processing sensor data as authentication factors. The sensor data received from sensors of a device.

According to an embodiment, at 411, the continuous authentication manager processes the sensor data against a pattern associated with the resource. The pattern is relevant to one or more of: model physical movements of the resource, model images of the resource, model voice patterns of the resource, historical travel patterns of the resource, historical modes of travel for the resource, historical brand purchases for brand goods made by the resource, and historical shopping purchases made by the resource.

In an embodiment, at 412, the continuous authentication manager processes the sensor data as at least one buddy device detected in proximity to the resource and identified in a buddy list associated with the resource.

At 420, the continuous authentication manager detects and authentication event indicating that a current authentication of the resource is needed.

According to an embodiment, at 421, the continuous authentication manager identifies the resource attempting to initiate the transaction operation. The attempt is identified as the authentication event. In other words, the user is conducting a transaction at a POS terminal and is attempting to checkout.

In an embodiment, at 422, the continuous authentication manager identifies the resource attempting to unlock the device for access. The attempt is identified as the authentication event.

At 430, the continuous authentication manager compares a current confidence value to a predetermined value to determine whether to provide a resource with access to one of: the device, a second resource, and a transaction operation.

According to an embodiment, at 431, the continuous authentication manager sends a fraud alert to a fraud system when the confidence value falls below a predefined amount when compared to the predetermined value.

Figure 5:
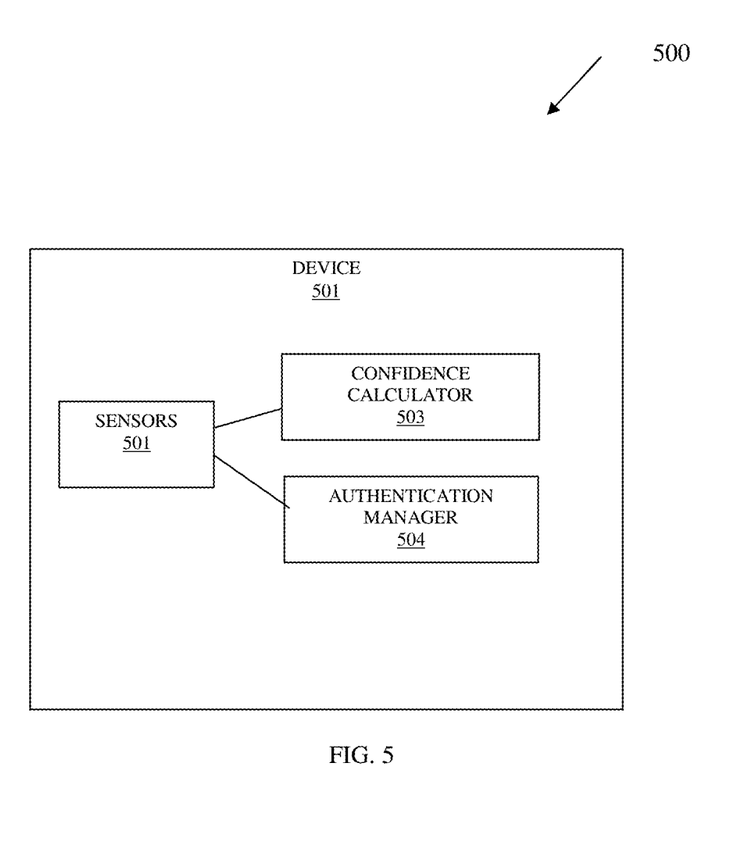
FIG. 5 is a diagram of a continuous automated authentication system, according to an example embodiment.

FIG. 5 is a diagram of a continuous automated authentication system 500, according to an example embodiment. The continuous automated authentication system 500 includes a variety of hardware components and software components. The software components of the continuous automated authentication system 500 are programmed and reside within secure memory and/or a non-transitory computer-readable medium and execute on one or more processors of the continuous automated authentication system 500. The continuous automated authentication system 500 communicates over one or more networks, which can be wired, wireless, or a combination of wired and wireless.

In an embodiment, the continuous automated authentication system 500 implements, inter alia, the embodiments discussed above with reference to the FIG. 1.

In an embodiment, the continuous automated authentication system 500 implements, inter alia, the system 200 of the FIG. 2.

In an embodiment, the continuous automated authentication system 500 implements, inter alia, the method 300 of the FIG. 3.

In an embodiment, the continuous automated authentication system 500 implements, inter alia, the method 400 of the FIG. 4.

In an embodiment, the continuous automated authentication system 500 implements all and/or various combinations of the embodiments of the FIG. 1, the system 200, the method 300, and the method 400.

The continuous automated authentication system 500 includes a device 501, one or more sensors 502, a confidence calculator 503, and an authentication manager 504.

In an embodiment, the device 501 is one of: a mobile phone, a wearable processing device, a tablet, a laptop, a computer desktop, a POS terminal, a SST, an ATM, an appliance, a kiosk, and a vehicle.

The sensors 502 are integrated and/or interfaced to the device 501. The sensors 502 are one or more of: a front-facing scanner, a rear-facing camera, a scanner, a microphone, a GPS receiver, a touch screen, an accelerometer, a gyroscope, a magnetometer, a thermometer, a barometer, a proximity sensor, a light sensor, a fingerprint scanner, and a card reader.

The sensors 502 are configured to provide sensor data to the confidence calculator 503. The sensors 502 are configured to collect the sensor data at continuous intervals of time and/or when an event triggers collecting the sensor data.

The confidence calculator 503 is configured to: execute on the device 501, continuously compute authentication values based on evaluation of sensor data continuously supplied by the sensors 502, and continuously provide the authentication values to the authentication manager 504.

In an embodiment, the confidence calculator 503 is one of the confidence calculators presented in the FIG. 2.

In an embodiment, the confidence calculator 503 is the method 300 of the FIG. 3.

The authentication manager 504 is configured to: execute on the device 501, continuously compare the authentication values supplied by the confidence calculator against a predetermined threshold value or predetermined range and make an authentication decision at a given point in time as to whether a user is authenticated for access to one of: the device 501, a resource accessible from the device 501, performance of a transaction operation.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed:

1. A method, comprising:
    obtaining, on a Point-Of-Sale (POS) terminal device, sensor data from a sensor;
    generating a confidence value from the sensor data, wherein generating further includes generating the confidence value and additional confidence values in an unobtrusive manner without any indication of the generating from the perspective of a resource associated with the confidence value and the additional confidence values, wherein generating further includes continuously generating the confidence value and the additional confidence values and providing the confidence value as a single scalar value processed to authenticate the resource at any given point in time, wherein generating further includes obtaining the additional confidence values from multiple different processing environments associated with paired devices that are paired to the POS terminal, and calculating an environment confidence value on each different processing environment by obtaining different sensor data from a sensor on each paired device; and
    providing the confidence value for passively authenticating the resource for access to a transaction operation from the POS terminal, and granting the resource different levels of access based on the confidence value to POS terminal resources of the POS terminal during the transaction operation, wherein providing further includes authenticating the resource based on the confidence value at the different levels of access without the resource being required to provide any credential and in a transparent manner with respect to the resource.

2. The method of claim 1, wherein obtaining further includes receiving the sensor data from a scanner of the POS terminal as a list of scanned items being purchased by a user during the transaction operation with the POS terminal.

3. The method of claim 1, wherein obtaining further includes receiving the sensor data from a scanner of the POS terminal as brand items being purchased by a user during the transaction operation with the POS terminal.

4. The method of claim 1, wherein obtaining further includes receiving the sensor data from a scan that identifies a buddy device for a buddy housed in a buddy list associated with the resource.

5. The method of claim 1, wherein obtaining further includes receiving the sensor data as one or more of: a route or travel and mode of travel for the resource.

6. The method of claim 1, wherein obtaining further includes receiving the sensor data from an accelerometer and a gyroscope defining physical motion of the resource.

7. The method of claim 1, wherein obtaining further includes receiving the sensor data from a Global Positioning Satellite (GPS) receiver defining physical positioning data and time data for the resource.

8. The method of claim 1, wherein obtaining further includes receiving the sensor data from a camera defining a facial image of a user who is the resource.

9. The method of claim 1, wherein obtaining further includes receiving the sensor data from a touch screen defining pressure and movement data of a finger of a user interacting with the touch screen, wherein the user is the resource.

10. The method of claim 1, wherein obtaining further includes receiving the sensor data from a microphone defining voice patterns of the resource and background noise obtained with the voice patterns.

11. The method of claim 1, wherein generating further includes comparing the sensor data to one or more of: a frequency model, a history model, and a pattern when generating the confidence value.

12. The method of claim 1 further comprising, continuously iterating the method processing at predefined intervals of time.

13. A method, comprising:
    continuously receiving confidence values generated by processing sensor data as authentication factors, wherein the sensor data received from sensors of a Point-Of-Sale (POS) terminal, wherein continuously receiving further includes receiving at least some of the confidence values from multiple different processing environments associated with paired devices that are paired to the POS terminal, and calculating, by each paired device, an environment confidence value for the different processing environment of the corresponding paired device by obtaining different sensor data from a sensor on the corresponding paired device;

continuously generating a single scalar value representing a current confidence value at any given point in time from the sensor data;

detecting an authentication event; and comparing the current confidence value upon the detecting of the authentication event to a predetermined value to determine whether to provide a resource with access to a transaction operation from the POS terminal, and granting the resource different levels of access based on the current confidence value to POS terminal resources of the POS terminal during the transaction operation, wherein comparing further includes authenticating the resource based on the current confidence value at the different levels of access without the resource being required to provide any credential and in a transparent manner with respect to the resource that is processed in an unobtrusive manner without any indications from a perspective of the resource of the authenticating and any additional authenticating processing.

14. The method of claim 13, wherein continuously receiving further includes processing the sensor data against a pattern associated with the resource, the pattern relevant to one or more of: model physical movements of the resource, model images of the resource, model voice patterns of the resource, historical travel patterns of the resource, historical modes of travel for the resource, historical brand purchases for brand goods made by the resource, and historical shopping purchases made by the resource.

15. The method of claim 13, wherein continuously receiving further includes processing the sensor data as at least one buddy device detected in proximity to the resource and identified in a buddy list associated with the resource.

16. The method of claim 13, wherein detecting further includes identifying the resource attempting to initiate the transaction operation as the authentication event.

17. The method of claim 13, wherein detecting further includes identifying the resource attempting to unlock the POS terminal for access as the authentication event.

18. The method of claim 13, wherein comparing further includes sending a fraud alert to a fraud system when the confidence value falls below a predefined amount when compared to the predetermined value.

19. A system, comprising:

a Point-Of-Sale (POS) terminal;

sensors integrated into the POS terminal, the sensors configured to: i) collect sensor data from an environment of the POS terminal at continuous intervals of time, and ii) continuously provide the sensor data to a confidence calculator as factors for authentication;

the confidence calculator configured to: i) execute on the POS terminal, ii) continuously compute first authentication values based on evaluation of the sensor data continuously supplied by the sensors, wherein at any given point in time the confidence calculator produces a first scalar value as a first current authentication value from the sensor data, and iv) continuously provide first authentication values to an authentication manager;

additional confidence calculators configured to: i) execute on paired devices that are paired to the POS terminal, ii) continuously compute second authentication values based on evaluation of other data continuously supplied by the paired devices, wherein at any given point in the additional confidence calculators produce second scalar values as second current authentication values; and iii) continuously provide the second authentication values to the authentication manager; and the authentication manager configured to: i) execute on the POS terminal, ii) continuously compare the first authentication values and the second authentication values against a predetermined value to make an authentication decision for a resource at any given point in time, wherein the authentication decisions includes granting the resource different levels of access to POS terminal resources of the POS terminal during a transaction operation on the POS terminal, and wherein the authentication manager configured to authenticate the resource based on the first authentication values, the second authentication values, and the predetermined value at the different levels of access without the resource being required to provide any credential and in a transparent manner with respect to the resource that is performed in an unobtrusive manner without any indication of authentication and subsequent authentication being processed from a perspective of the resource.

* * * * *